Feb. 28, 1933.                 D. M. HUME                 1,899,619
                DEVICE FOR DEPOSITING SALT IN CANNED GOODS
                Filed Feb. 5, 1932          3 Sheets-Sheet 1
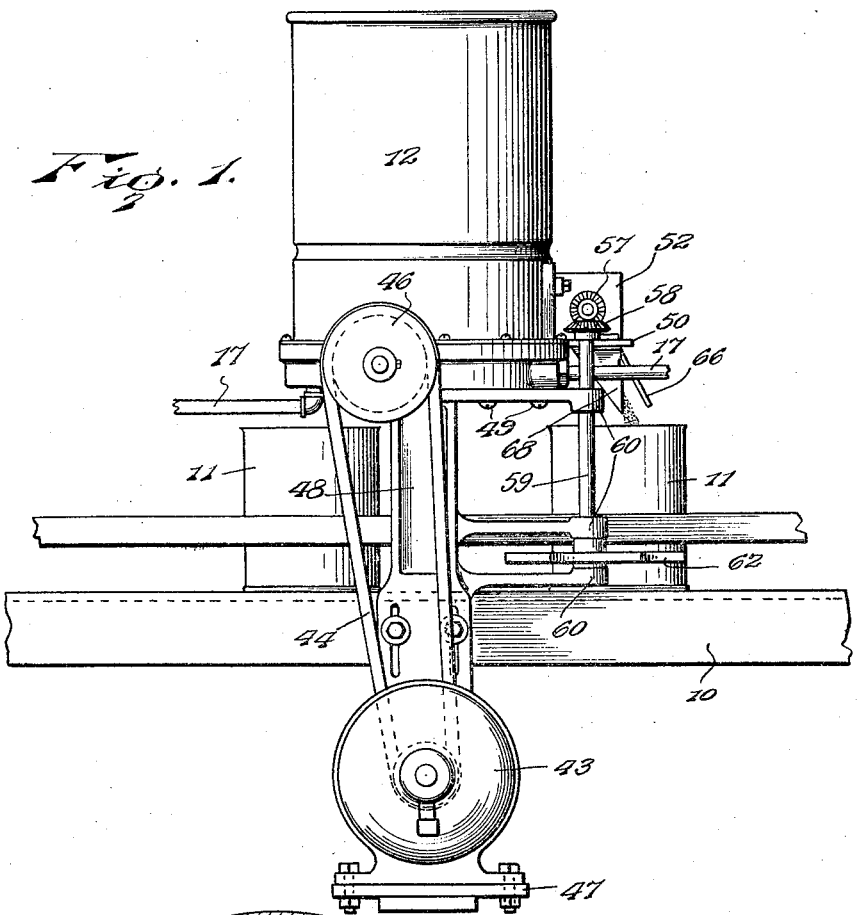

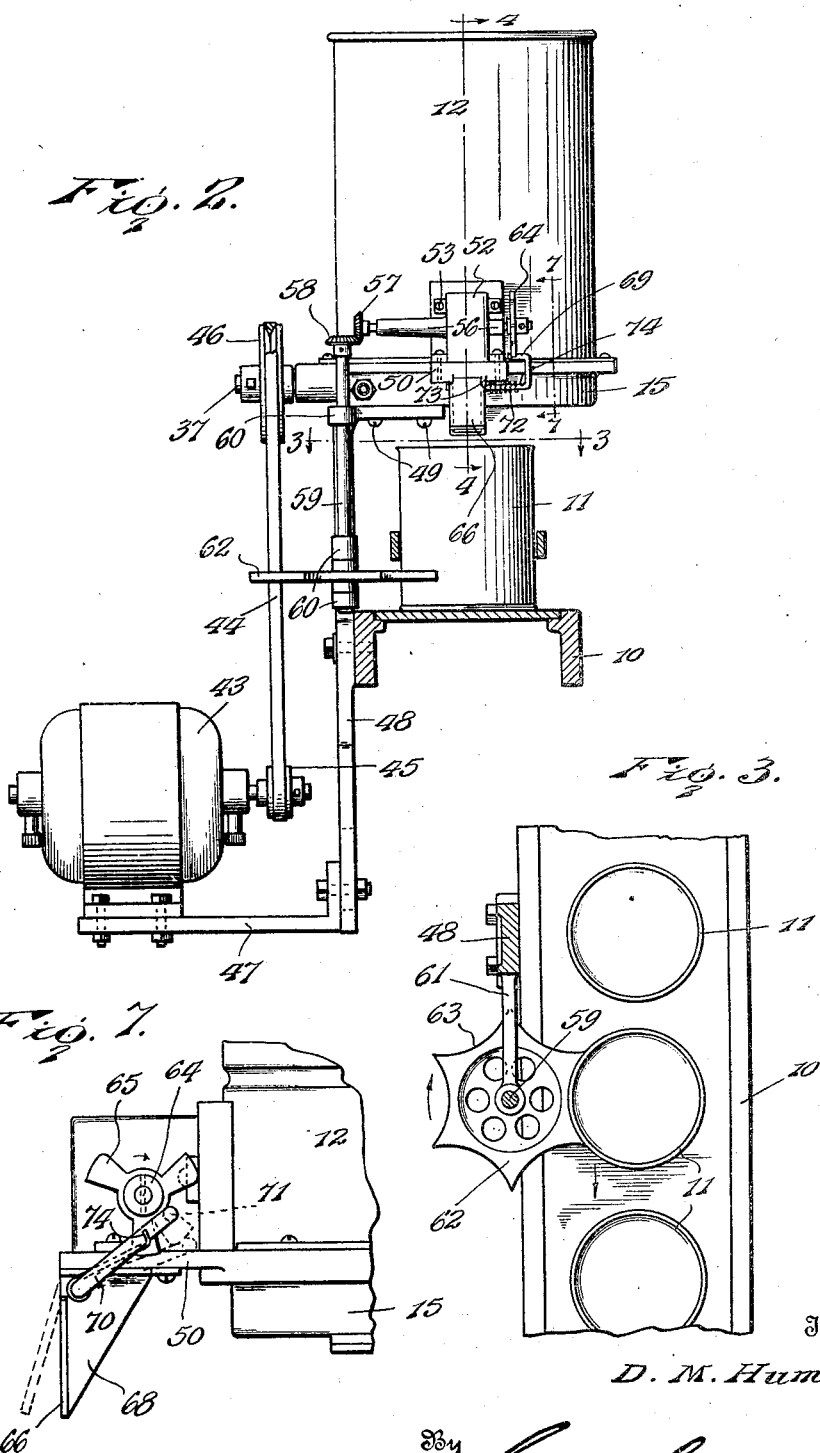

Feb. 28, 1933.  D. M. HUME  1,899,619
DEVICE FOR DEPOSITING SALT IN CANNED GOODS
Filed Feb. 5, 1932   3 Sheets-Sheet 3
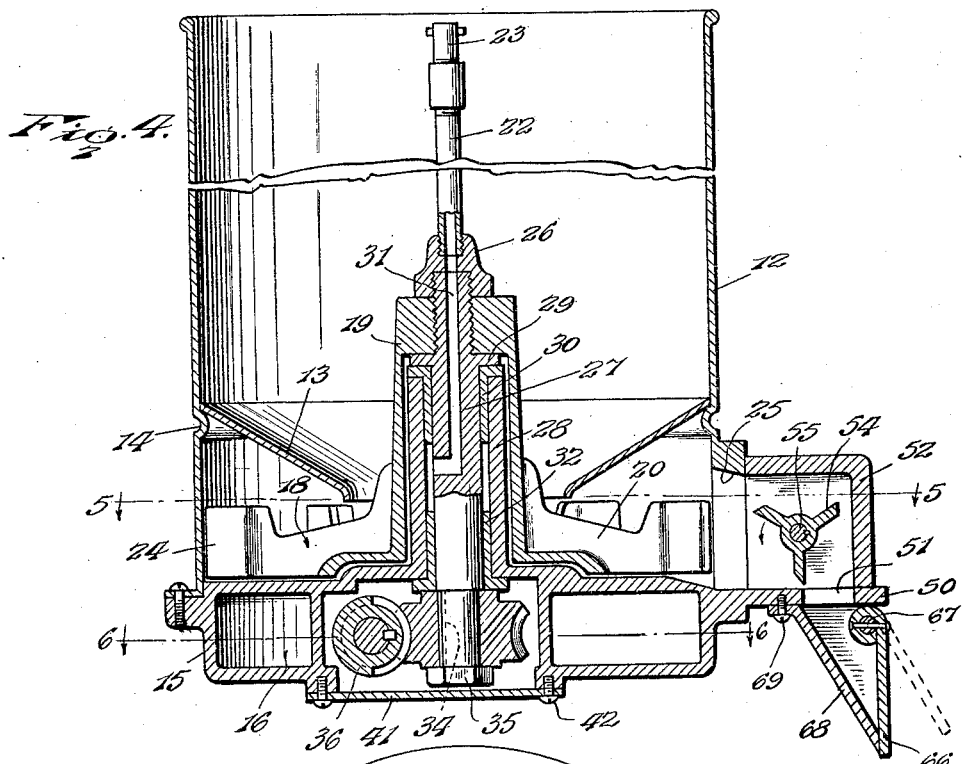
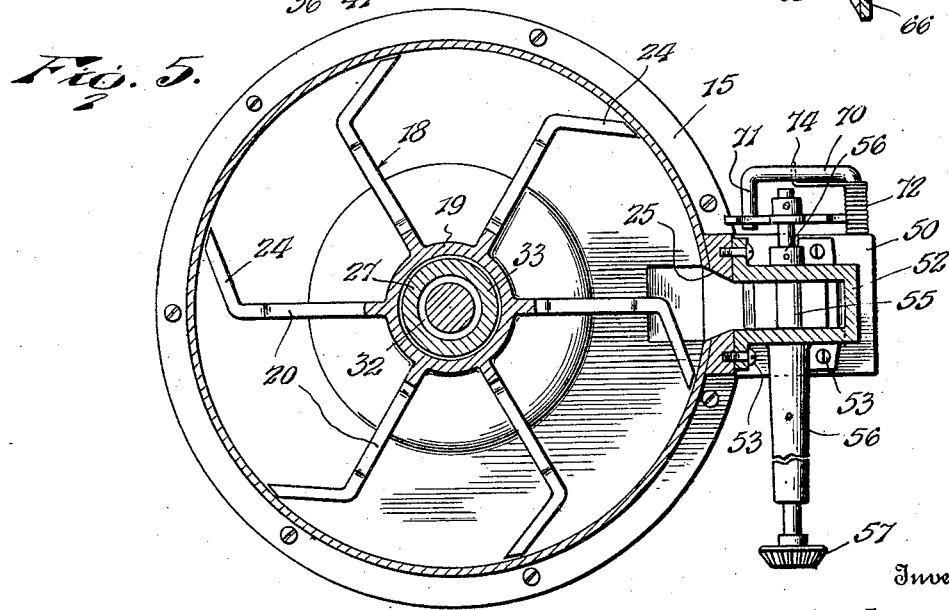
Inventor
D. M. Hume.
By Lacey & Lacey,
Attorneys Patented Feb. 28, 1933

1,899,619

UNITED STATES PATENT OFFICE

DAMON MARCEL HUME, OF REDKEY, INDIANA

DEVICE FOR DEPOSITING SALT IN CANNED GOODS

Application filed February 5, 1932. Serial No. 591,185.

This invention relates to a device for depositing salt in canned goods and has for an object to provide apparatus adapted to be automatically operated by the cans passing along the conveyor to the closing machine to deposit a measured quantity of salt in each can.

A further object is to provide salt dispensing apparatus having a heating chamber in the base to dry the salt.

A further object is to provide a novel agitator for delivering the salt to the filling spout, a false bottom being provided in the salt container above the agitator to relieve the agitator of the weight of the salt in the container so that minimum power will be consumed in driving the agitator.

A still further object is to provide a measuring chamber in which a star knife operates to dispense a measured quantity of salt into the cans in sequence.

A further object is to provide a novel cam which operates in synchronism with the star knife and trips a trap door in the discharge spout to properly time the salt depositing operation.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of the device,

Figure 2 is an end elevation of the device,

Figure 3 is a cross section taken on the line 3—3 of Figure 2 showing the trip wheel, Figure 4 is an enlarged vertical section taken on the line 4—4 of Figure 2, Figure 5 is a cross section taken on line 5—5 of Figure 4, Figure 6 is a cross section taken on line 6—6 of Figure 4, and Figure 7 is a detail elevation of the cam and door controlling mechanism.

Referring now to the drawings in which like characters of reference designate similar parts in the various views, 10 designates an endless conveyor upon which the filled cans 11 are carried to the closing machine.

For depositing a measured quantity of salt in each can prior to closing I provide a hopper 12 for the salt to be dispensed, there being a funnel shaped false bottom 13 secured at the upper flared end to a rib 14 formed in the hopper as best shown in Figure 4. The hopper extends below the false bottom and is preferably bolted or otherwise secured to a casting 15, which as best shown in Figure 6 is provided with an internal arcuate steam chamber 16. Steam pipes 17 enter the chamber. The purpose of the steam chamber is to dry the salt, and obviously circulating hot water or electric heating coils may be substituted for steam if desired.

As best shown in Figures 4 and 5 an agitator 18 is disposed on top of the casting 15 and is provided with a long central hub 19 and radial fins 20. The ends of the fins are directed rearwardly at an oblique angle to provide scrapers 24 which force the salt laterally ahead of them into a discharge nozzle 25 disposed on the side of the hopper.

For rotating the agitator the hub 19 is threaded onto a screw 26 carried by the upper end of a stand shaft 27 which extends downwardly through the base of the hub and is rotatively mounted in an upright axial sleeve 28 integral with the casting 15. The shaft 27 is provided above the sleeve 28 with a stop collar 29 and a hollow lock nut 21 by means of which parts the hub is firmly locked to the shaft. The stop collar is seated on a flanged bushing 30 which is inserted in the upper end of the sleeve and a flanged bushing 32 surrounds the shaft at the lower end of the sleeve to properly center the shaft in the sleeve.

A small pipe 22 is threaded into the nut 21 and is fitted with a grease cup 23 to supply lubricant to the bearing bushings 30 and 32 through a duct 31 in the shaft 27.

A worm gear 33 is secured to the lower end of the stand shaft by means of a key 34 and a nut 35 and meshes with a worm pinion 36 best shown in Figure 6. The worm pinion shaft 37 is journaled in suitable bearings 38 and 39 integral with the casting 15. A stuffing box 40 makes the bearing 39 gas tight. Access to the worm gear and worm pinion is obtained by the removal of a base plate 41, which preferably is secured to the casting around the edges of a hand-hole, by screws 42 as shown in Figure 4.

Although the agitator may be driven from the conveyor, or otherwise actuated, it is preferably to rotate the agitator by means of an electric motor 43, the shaft of the motor and the worm pinion shaft 37 being connected together by a belt 44 and pulleys 45 and 46, so that slip may occur in case the agitator becomes jammed by some foreign matter in the salt. The motor is bolted or otherwise secured to the shelf 47 of a bracket 48 which is preferably secured to the bottom of the casting by lag screws 49.

Integral with the casting is a laterally extended plate 50, best shown in Figures 4 and 5, having an opening 51 therein. A small casing 52 is mounted on the plate above the opening and is open at the rear side to register with nozzle 25. The casing may be secured to the plate and to the nozzle by means of screws 53 and constitutes a measuring chamber into which the salt is forced by the agitator.

A star knife 54, having any desired number of blades is fixed to a shaft 55 which is rotatively mounted in bearings 56 integral with the side walls of the casing as best shown in Figure 2. One end of the shaft is equipped with a gear 57 which meshes with a gear 58, see Figure 1, carried by a stand shaft 59 which is journaled in bearings 60 carried by lateral arms 61 integral with the bracket 48.

A trip wheel 62 is fixed to the stand shaft 59 and as best shown in Figure 3 is provided on the periphery with a plurality of concave faces 63 in which the cans 11 lodge as they progress past the apparatus and impart rotary movement to the wheel with resultant actuation of the star knife to dispense the salt from the measuring chamber through the opening 51.

It is essential that the salt be deposited accurately in the cans at the moment the cans arrive in registry with the measuring chamber and for this purpose a cam 64 is fixed to the star knife shaft 55 outside of the casing 52 as best shown in Figure 7. The cam is provided with radial arms 65.

The purpose of the cam is to open a trap door 66, which is fixed at the top as shown in Figure 4 to a hinge pintle 67, which is journaled in the sides of a chute 68 that is attached to the plate 50 below the discharge opening 51 by means of a screw 69 or otherwise. The pintle 67 projects outwardly from the chute at one end and is equipped with a crank arm 70, best shown in Figures 5 and 7, the crank arm terminating in a lateral lug 71 which projects into the path of movement of the rotating cam arms 65 and is struck by the latter in sequence to depress the lever arm 70 and swing open the trap door to the dotted line position shown in Figure 7. A spring 72 is coiled around the pintle 67 to swing the door closed and reset the crank arm 70 after each actuation by the cam arms 65. One end, 73 of the spring may be lodged against a convenient part of the chute as best shown in Figure 2, while the opposite end 74 is hooked around the lever arm as best shown in Figure 7 to cause the tensioning of the spring during opening of the trap door so that expansion of the spring will cause lug 71 of the pintle to follow the contour of the cam 64 as will be understood.

It will be understood that the apparatus may be adjusted to dispense salt to cans of various sizes by changing the gear ratio, cut outs, or concavities in the trip wheel, number of arms on the cam and number of blades on the star knife accordingly. Also it will be observed that the star knife may be of such size as to eject the proper amount of salt corresponding to the size of the can, the usual proportion being one teaspoonful per quart.

In operation the salt is dumped into the hopper from whence it gravitates at the constricted lower end of the false bottom 13 on to the rotating agitator 18, it being, of course, understood that the heating chamber in the casting has been supplied with steam to maintain the salt in a dry state. The scrapers 24 ejects the salt through the nozzle 25.

As each can in turn moves the trip wheel 52 the star knife will be correspondingly rotated to dispense a predetermined quantity of salt into the chute. As the cans 11 move into central position with respect to the apparatus an arm 65 of the cam will impinge against the lug 71 of the hinge pintle of the trap door and depress the lever arm 70 thereof to open the trap door and permit the measured quantity of salt to gravitate into the can. Further movement of the can 11, as will be understood, positions the trip wheel 52 to receive the next succeeding can while in the interim the trap door has been closed by expansion of the tensioned spring 72, the star knife meanwhile accumulating a measured quantity of salt in the chute to supply the next can.

What is claimed is:

1. A device for depositing salt in moving cans comprising a hopper, a rotary agitator in the bottom of the hopper, a heating chamber in the bottom of the hopper for drying the salt, a trip wheel suspended from the hopper and adapted to be actuated by the moving cans, and a measuring device communicating with the hopper laterally of the agitator and operatively connected with the trip wheel to dispense a predetermined quantity of salt to the moving cans in sequence.

2. A device for depositing salt in moving cans comprising a hopper, an agitator in the hopper having radial fins, a measuring chamber disposed laterally of the agitator on the hopper, there being a discharge opening in the hopper communicating with the chamber, the ends of the fins of the agitator being reversely bent at an angle to provide scrapers adapted to force the salt through said discharge opening into said chamber, a trip wheel disposed below the hopper and adapted to be rotated by the moving cans, and dispensing apparatus operatively connected to be driven by the trip wheel to discharge the salt from said chamber into the moving cans.

3. A device for depositing salt in moving cans comprising a hopper, a rotary agitator on the bottom of the hopper, a measuring chamber disposed laterally of the agitator, a rotary star knife in the chamber, a cam assembled with the star knife outside of the chamber, a trip wheel adapted to be rotated by the moving cans, operative connections between the trip wheel and the star knife for driving the knife and cam as an unit, said measuring chamber having a discharge opening, and a hinged closure for said opening operatively connected to be moved by the cam.

4. A device for depositing salt in moving cans comprising a hopper, a funnel shaped false bottom in the hopper, an agitator below the false bottom, a heating chamber below the agitator, means disposed externally of the hopper for rotating the agitator, and can operated means for dispensing a predetermined quantity of salt from the hopper laterally of the agitator.

5. A device for depositing salt in moving cans comprising a hopper, an agitator in the bottom of the hopper, a trip wheel suspended from the hopper and adapted to be actuated by the moving cans, a measuring chamber on one side of the hopper communicating with the hopper in the plane of the agitator, a star knife in the chamber geared to the trip wheel for simultaneous rotation therewith, there being a discharge opening in said chamber, a hinged closure for the opening, a cam operatively connected to the star knife to be driven thereby for opening the trap door, and a spring for closing the trap door.

6. A device for depositing salt in moving cans comprising a hopper, an agitator in the hopper, a measuring chamber disposed laterally of the agitator on the hopper, there being a discharge opening in the hopper communicating with the chamber, a chute below and communicating with the chamber, a hinged trap door spring pressed to normally seal the chute, a shaft journaled in the walls of the chamber, a star knife fixed to the shaft within the chamber, a cam fixed to the shaft outside of the chamber, a lever arm integral with the trap door and having a lateral lug disposed in the path of movement of the cam to be tripped thereby for opening the trap door against the tension of its spring, and a trip wheel suspended from the hopper for rotation by the moving cans and geared to said shaft.

7. A device for depositing salt in moving cans comprising a hopper, a rotary agitator in the bottom of the hopper, a measuring chamber outside of the hopper disposed to receive the salt from said agitator, a star knife in the chamber, a trip wheel suspended from the hopper below the chamber in the path of movement of the cams for rotation thereby, an operative connection between the trip wheel and the star knife for moving the wheel and knife in unison, said chamber having a discharge opening, a spring pressed door normally closing said opening, and a cam operatively connected to the star knife and to the door for opening the door against the tension of its spring.

In testimony whereof I affix my signature.

DAMON MARCEL HUME. [L. S.]